United States Patent
Budd

(10) Patent No.: US 6,510,615 B1
(45) Date of Patent: Jan. 28, 2003

(54) MODEL AIRPLANE CONTROL SURFACE POSITION MEASUREMENT SYSTEM AND METHOD

(76) Inventor: Gerald D. Budd, 42076 Shadow Hills Dr., Quartz Hill, CA (US) 93536

( * ) Notice: Subject to any disclaimer, the term of this patent is extended or adjusted under 35 U.S.C. 154(b) by 0 days.

(21) Appl. No.: 09/982,567

(22) Filed: Oct. 16, 2001

(51) Int. Cl.[7] .............................................. G01B 11/26
(52) U.S. Cl. .............................. 33/286; 33/293; 33/530; 33/534
(58) Field of Search .......................... 33/1 N, 227, 263, 33/264, 282, 286, 288, 293, 530, 534, DIG. 21

(56) References Cited

U.S. PATENT DOCUMENTS

| | | | | |
|---|---|---|---|---|
| 2,796,669 A | * | 6/1957 | Jordan et al. .................. | 33/530 |
| 2,896,327 A | * | 7/1959 | Thomann ...................... | 33/293 |
| 3,612,949 A | * | 10/1971 | Becraft et al. ................. | 33/286 |
| 3,638,317 A | * | 2/1972 | Felix ............................ | 33/293 |
| 3,857,639 A | * | 12/1974 | Mason ......................... | 33/293 |
| 4,488,050 A | * | 12/1984 | Iwafune ........................ | 33/293 |
| 5,018,853 A | * | 5/1991 | Hechel et al. ................. | 33/288 |
| 5,987,762 A | * | 11/1999 | Toth et al. ..................... | 33/227 |
| 6,098,297 A | * | 8/2000 | Belfiore ........................ | 33/286 |
| 6,374,507 B1 | * | 4/2002 | Lehto ........................... | 33/286 |

* cited by examiner

Primary Examiner—G. Bradley Bennett
(74) Attorney, Agent, or Firm—Dennis W. Beech

(57) ABSTRACT

The model airplane control surface position measurement system and method uses an adjustable ruler scale attached to a support stand in combination with a laser device attached to the trailing edge of a control surface of the model airplane. The laser device may be adjusted to orient the light beam axis to be approximately perpendicular to the control surface hinge axis. The ruler scale may be positioned behind the control surface at a distance from the hinge axis using a positioning rod. The support stand is adjusted to orient the positioning rod perpendicular to the ruler scale at a zero angle deflection mark. The ruler scale is also adjusted such that the laser device light beam is incident at the zero angle deflection mark. The model airplane control surface may then be deflected by the control mechanism and the deflection angle observed on the ruler scale at the point of incidence of the laser device light beam.

7 Claims, 3 Drawing Sheets

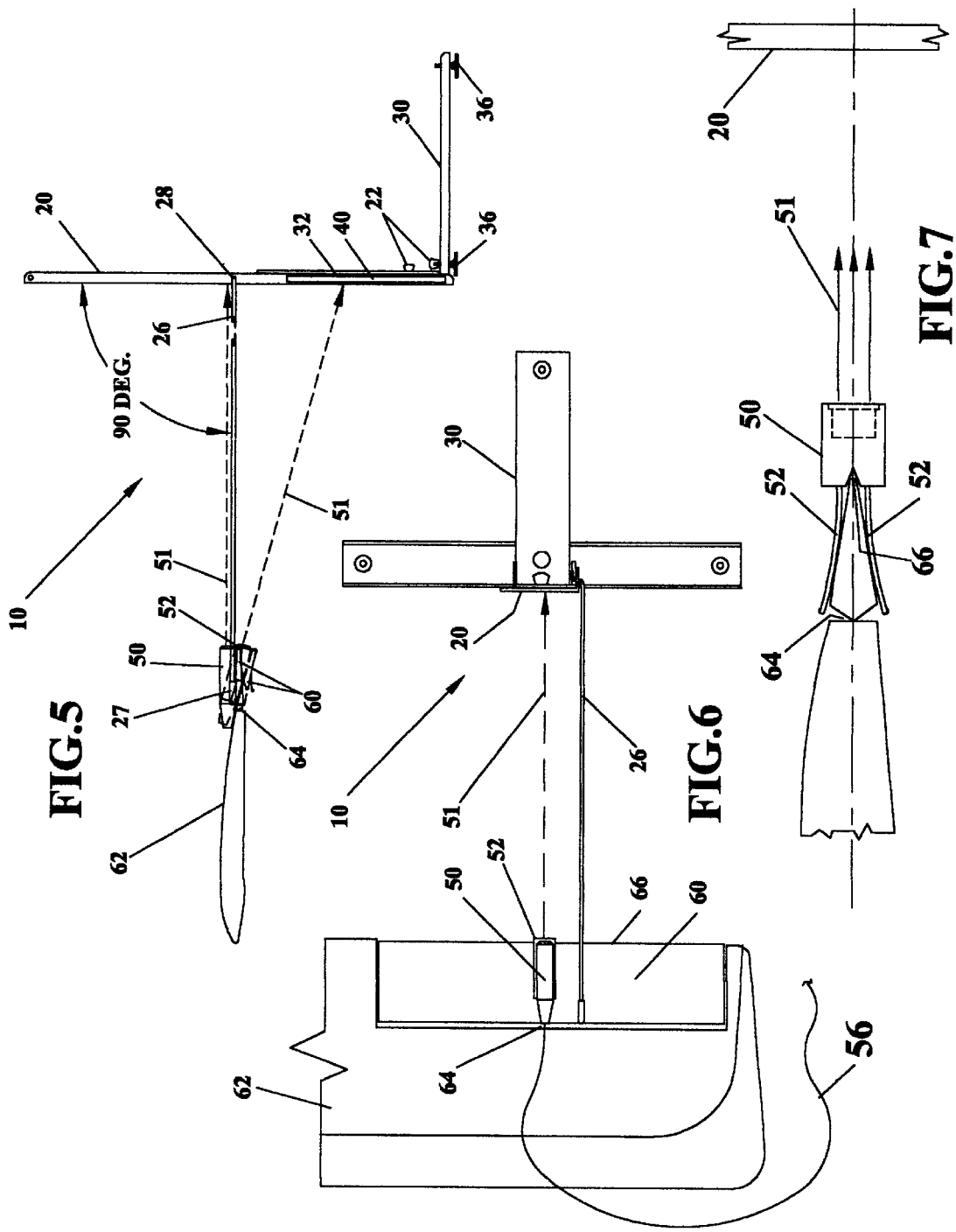

MODEL AIRPLANE CONTROL SURFACE POSITION MEASUREMENT SYSTEM AND METHOD

BACKGROUND OF THE INVENTION

This invention relates to systems used to measure the positioning of model airplane control surfaces relative to servomechanism position control signals. The new system uses a laser, attached to a control surface, projecting a light beam on a ruler scale to measure the deflection of the control surface.

Devices and methods for measurement of the deflection of control surfaces for model airplanes have been in use for many years. These methods usually involve the use of a protractor or similar curved scale measuring device positioned adjacent to a control surface to visualize angular deflection of the control surface. In some devices the curved scale may be attached to the control surface to aid in viewing the deflection thereof.

In all of these measurement techniques the angular moment relative to the measurement scale is small. Also the holding of the measuring device in the hand does not create a stable platform for accurate measurement. In those instances where the measurement scale is attached to a control surface, wing or other model airplane structure, the device is normally clamped to the airplane structure and uses mechanical brackets and extension rod structures to relate control surface motion to a measuring scale. These systems are difficult to position reliably and result in inaccurate measurement readings due to the mechanical mechanisms used to allow visual observation of deflection angles.

As can be seen, there is a need for a simple to use control surface position measurement system that provides a relatively accurate deflection angle measurement.

SUMMARY OF THE INVENTION

A model airplane control surface position measurement system and method according to the present invention comprises a laser light source for attachment to a control surface and a ruler scale having a positioning rod for location relative to the control surface hinge axis. One object of the invention is relatively accurate measurement of model airplane control surface relative deflection caused by servomechanism operation. Another object is ease in positioning the measurement system elements relative to the model airplane for control surface accurate deflection measurement.

These and other features, aspects and advantages of the present invention will become better understood with reference to the following drawings, description and claims.

BRIEF DESCRIPTION OF THE DRAWINGS

FIG. 5 illustrates a side elevation view of the measurement system relative to a control surface according to an embodiment of the invention;

FIG. 6 illustrates a top plan view of the measurement system according to an embodiment of the invention;

FIG. 7 illustrates a partial side schematic view of the measurement system relative to the control surface with alternate laser device location according to an embodiment of the invention.

DESCRIPTION OF THE PREFERRED EMBODIMENT

Figure 1:
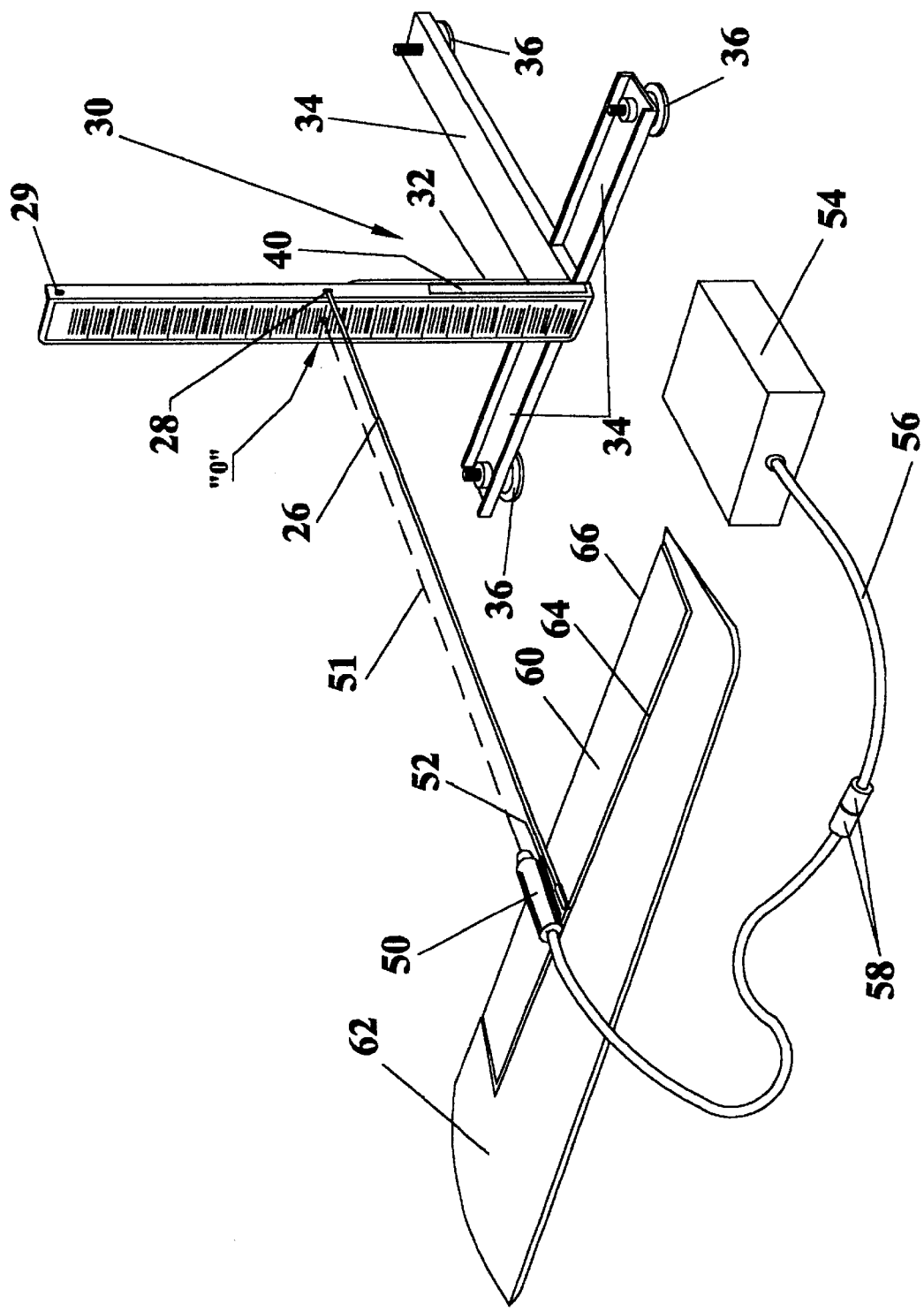
FIG. 1 illustrates a perspective view of the control surface position measurement system position relative to a wing element according to an embodiment of the invention.
Figure 2A:
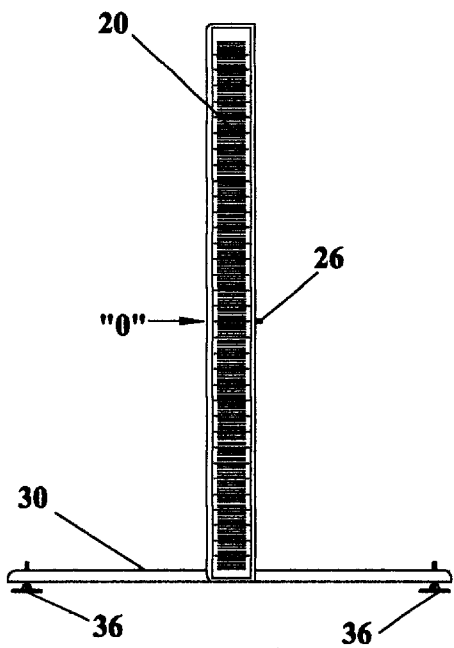
FIG. 2A illustrates a front elevation view of the ruler scale in a vertical position and support stand according to an embodiment of the invention.
Figure 2B:
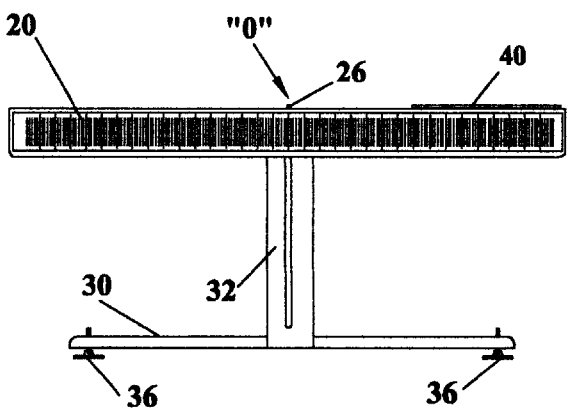
FIG. 2B illustrates a front elevation view of the ruler scale in a horizontal position and support stand according to an embodiment of the invention.
Figure 3:
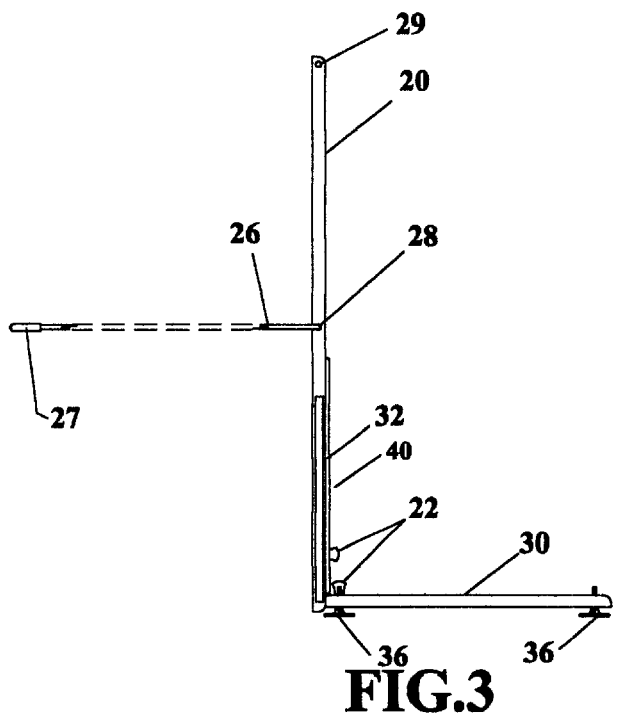
FIG. 3 illustrates a side elevation view of the ruler scale and support stand according to an embodiment of the invention.

The following detailed description is the best currently contemplated modes for carrying out the invention. The description is not to be taken in a limiting sense, but is made merely for the purpose of illustrating the general principles of the invention.

The model airplane control surface position measurement system and method includes a measurement system 10 having an adjustable ruler scale attached to a support stand, a positioning rod for location relative to a control surface hinge axis, and a laser device for attachment to the control surface to project a light beam on the ruler scale for deflection observation. The use of the laser device allows an extended moment arm, the light beam, to project the angular deflection of the control surface as compared to less accurate currently known systems.

Referring to FIGS. 1 through 4, the measurement system 10 has an adjustable ruler scale 20 attached to a support stand 30. The support stand 30 may have a scale bracket 32 attached to a plurality of support legs 34. The support stand 30 is illustrated with three support legs 34 in a "T" structure; however, obviously other structural form factors may be used. The legs 34 may have feet 36 which may be threadably engaged with the legs 34 to allow adjustment thereof to position the ruler scale 20 relative to a control surface 60 of a model airplane element such as a wing 62 and a laser device 50 attached thereto. The support legs 34 and scale bracket 32 may be attached by a screw (not shown) and a knob 22.

Figure 4:
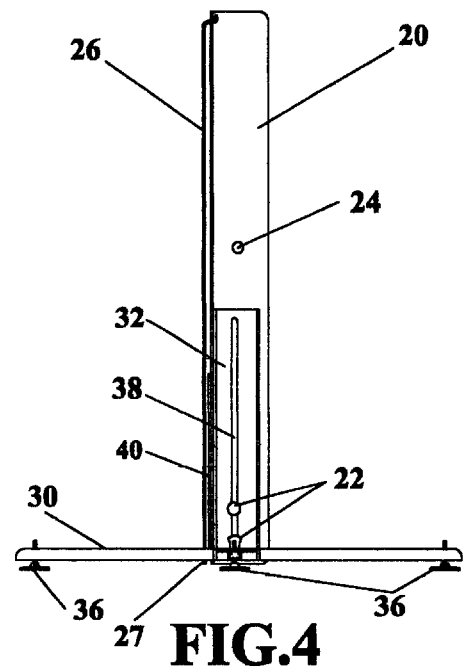
FIG. 4 illustrates a back elevation view of the ruler scale and support stand according to an embodiment of the invention.

The ruler scale 20 may be attached to the scale bracket 32 by an adjustment knob 22. The ruler scale 20 may have a threaded shaft 24 which may be inserted through a slot 38 in the support stand 30. The knob 22 is then threaded onto the shaft 24 and tightened to retain the ruler scale 20. The slot 38 allows vertical adjustment relative to a control surface 60 zero position indication as projected by the laser device 50. A threaded shaft 24 may be attached to the ruler scale 20 at a lower end as illustrated in FIG. 4 where the knob 22 is installed and at the center or behind the zero angular deflection position of the ruler scale 20. The center located threaded shaft 24 may be used to orient the ruler scale 20 horizontally.

A position rod 26 may be attached to the ruler scale 20 by use of an aperture 28 through which the rod 26 is rotatably inserted. The aperture may be located adjacent the zero angular deflection position of the ruler scale 20. The ruler scale 20 may be ruled to have the center thereof as the zero deflection angle point and graduated markings on the longitudinal axis to indicate angular deflection about the zero point. A storage aperture 29 and magnetic strip 40 may also be provided on the ruler scale 20 for storing of the position rod 26 as illustrated in FIG. 4.

The relative ruled scale of the ruler scale 20 may be based on the trigonometric relationship of the vertical distance of the ruler scale 20 from the control surface 60 hinge axis 64 and the projected angular difference along the laser device 50 light beam. The angular relationship at the hinge axis 64 may be calculated and the straight ruler scale 20 marked with graduations. The scale may be nonlinear, but may indicate in degrees the deflection for a given beam spot on the ruler scale 20.

Referring to FIGS. 1, 5 and 6, the laser device 50 may be attached to a control surface by a clip 52. A battery 54 may be electrically connected to the laser device 50. The connection may be by wires 56 having a switch 58 to control the intensity of the light beam of the laser device 50. The laser device 50 may be a simple laser diode device with focal length of approximately 20 inches sufficient to present a dot light spot on the ruler scale 20. Such laser devices may be found that weigh approximately 1/10 ounces when a clip is attached thereto. A class 3A laser diode has been found to be a reasonable quality light source.

In use the measurement system 10 may be located rearward of the control surface 60 for which deflection measurements are to be made. The position rod 26 may be placed at a distal end 27 on hinge axis 64 to locate the proper distance between ruler scale 20 and hinge axis 64. The laser device 50 may be clipped to the control surface 60 trailing edge 66 and oriented for a light beam axis 51 to be approximately perpendicular to the hinge axis 64. The support stand 30 may then be adjusted using feet 36 such that the position rod is approximately perpendicular to the ruler scale 20.

The control device (not shown) that operates the control surface 60 may be manipulated to deflect the control surface 60. The upper and lower limits of the possible deflection may be observed by the position of the light beam on the ruler scale 20. A similar measurement, for example, on a second wing control surface may allow comparison of the deflection to assure the deflections are consistent for proper control of the model airplane. While the description has assumed a horizontal oriented control surface 60, a vertical control surface such as a rudder may have deflection measured by rotating the ruler scale 20 ninety degrees and attaching the laser device 50 to the rudder trailing edge.

Referring to FIG. 7, an embodiment of the invention with the clip 52 attached at the rear of the laser device 50 may be attached to the trailing edge 66 with the laser device 50 protruding off the trailing edge 66. In this position the parallax that may occur if the laser device 50 is positioned on top of the control surface 60 may be minimize by the orientation of the light beam axis 51 and relative position to the ruler scale 20.

While the invention has been particularly shown and described with respect to the illustrated and preferred embodiments thereof, it will be understood by those skilled in the art that the foregoing and other changes in form and details may be made therein without departing from the spirit and scope of the invention.

I claim:

1. A measurement system to measure the relative deflection of a model airplane control surface comprising:

a ruler scale slidably attached to a support stand;

a position rod rotatably attached at the approximate center of said ruler scale; and a laser device attachable to a trailing edge of a control surface.

2. The measurement system as in claim 1 wherein said support stand having a scale bracket with a slot formed therein and said ruler scale having a threaded shaft positioned for insertion through said slot for slidable attachment to said scale bracket by a knob threaded on said threaded shaft.

3. The measurement system as in claim 1 wherein said support stand having a plurality of legs for vertical support of said ruler scale and a foot threadably engaged with each leg.

4. The measurement system as in claim 1 wherein said laser device having a clip for attachment.

5. The measurement system as in claim 1 wherein a pair of electrical wires connects a battery to said laser device and a switch controls said laser device light intensity.

6. A measurement system to measure the relative deflection of a model airplane control surface comprising:

a ruler scale having a threaded shaft positioned for insertion through a scale bracket having a slot formed therein and said ruler scale slidably attached to said scale bracket by a knob threaded on said threaded shaft;

said scale bracket attached to a support stand having a plurality of legs for vertical support of said ruler scale and a foot threadably engaged with each leg;

a position rod rotatably attached at the approximate center of said ruler scale at a zero degree mark thereon and said ruler scale lined to indicate degrees of deflection; and a laser device attachable to a trailing edge of a control surface approximately perpendicular to a hinge axis and positioned to direct a light beam on said ruler scale.

7. A method for measuring relative deflection of a model airplane control surface, comprising the steps of:

positioning a ruler scale attached to a support stand rearward of a control surface;

attaching a laser device to said control surface at a trailing edge;

adjusting said laser device such that a light beam axis is approximately perpendicular to a hinge axis;

adjusting said ruler scale such that said laser device light beam is incident on said ruler scale at a zero degree mark thereon;

placing a distal end of a position rod attached to said ruler scale at said hinge axis adjacent said laser device;

adjusting said support stand such that said position rod is approximately perpendicular to said ruler scale;

operating a control device for deflection of said control surface; and observing the position of said laser device light beam on said ruler scale.

* * * * *